(12) United States Patent
Mizukami

(10) Patent No.: US 11,105,246 B2
(45) Date of Patent: Aug. 31, 2021

(54) DEGRADATION DIAGNOSIS DEVICE FOR EXHAUST PURIFICATION SYSTEM

(71) Applicant: Isuzu Motors Limited, Tokyo (JP)

(72) Inventor: Nao Mizukami, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 17/040,554

(22) PCT Filed: Mar. 22, 2019

(86) PCT No.: PCT/JP2019/012085
§ 371 (c)(1),
(2) Date: Sep. 23, 2020

(87) PCT Pub. No.: WO2019/182112
PCT Pub. Date: Sep. 26, 2019

(65) Prior Publication Data
US 2021/0040875 A1  Feb. 11, 2021

(30) Foreign Application Priority Data
Mar. 23, 2018 (JP) .............................. JP2018-056008

(51) Int. Cl.
| | |
|---|---|
| *F01N 11/00* | (2006.01) |
| *B01D 53/94* | (2006.01) |
| *B60Q 9/00* | (2006.01) |
| *F01N 3/20* | (2006.01) |
| *F01N 3/28* | (2006.01) |

(52) U.S. Cl.
CPC .......... *F01N 11/00* (2013.01); *B01D 53/9418* (2013.01); *B01D 53/9431* (2013.01);
(Continued)

(58) Field of Classification Search
CPC ...... F01N 11/00; F01N 3/2066; F01N 3/2892; F01N 2550/03; F01N 2550/05;
(Continued)

(56) References Cited

U.S. PATENT DOCUMENTS 9,181,831 B2 * 11/2015 Wakamatsu .......... F01N 11/002
2013/0028792 A1   1/2013 Yano et al.
(Continued)

FOREIGN PATENT DOCUMENTS

| JP | 2000-064826 | 2/2000 |
| JP | 2009-220033 | 10/2009 |

(Continued)

OTHER PUBLICATIONS

International Search Report and the Written Opinion dated Jun. 4, 2019 From the International Searching Authority Re. Application No. PCT/JP2019/012085 and Its Translation of Search Report Into English. (7 Pages).

*Primary Examiner* — Brandon D Lee

(57) ABSTRACT

This degradation diagnosis device for an exhaust purification system makes it possible to discover degradation of a constituting component in an exhaust purification system at an early stage. The degradation diagnosis device for an exhaust purification system that purifies exhaust gas discharged from an internal combustion engine into an exhaust pipe is provided with: a degradation degree estimation unit that estimates the degree of degradation due to corrosion of a constituting component in the exhaust purification system based on the temperature of exhaust gas and the amount of a reducing agent injected into the exhaust pipe; a determination unit that determines whether the degradation degree estimated by the degradation degree estimation unit exceeds a predetermined threshold; and an output unit that outputs the result of determination made by the determination unit.

10 Claims, 3 Drawing Sheets

(52) U.S. Cl.
CPC ............. B60Q 9/00 (2013.01); F01N 3/2066 (2013.01); F01N 3/2892 (2013.01); *F01N 2550/03* (2013.01); *F01N 2550/05* (2013.01); *F01N 2610/02* (2013.01)

(58) Field of Classification Search
CPC ......... F01N 2610/02; F01N 2900/1812; F01N 2550/02; F01N 2900/1404; F01N 3/021; B01D 53/9418; B01D 53/9431; B01D 2251/2067; B01D 2258/012; B01D 2255/50; B01D 53/9477; B01D 53/9495; B60Q 9/00; Y02T 10/12; Y02T 10/40; Y02A 50/20
See application file for complete search history.

(56) References Cited

U.S. PATENT DOCUMENTS

| | | | |
|---|---|---|---|
| 2013/0064719 | A1 | 3/2013 | Wakamatsu et al. |
| 2013/0064725 | A1 | 3/2013 | Kageyama et al. |

FOREIGN PATENT DOCUMENTS

| | | |
|---|---|---|
| JP | 2011-220232 | 11/2011 |
| JP | 2011-247128 | 12/2011 |
| JP | 2011-247134 | 12/2011 |
| JP | 2012-237291 | 12/2012 |
| JP | 2018-021514 | 2/2018 |
| WO | WO 2019/182112 | 9/2019 |

* cited by examiner

DEGRADATION DIAGNOSIS DEVICE FOR EXHAUST PURIFICATION SYSTEM

TECHNICAL FIELD

The present disclosure relates to a degradation diagnosis device for an exhaust purification system.

BACKGROUND ART

Exhaust gas discharged from an internal combustion engine contains nitrogen oxides (NOx). In order to purify NOx, an exhaust purification system is known which includes an injector for injecting urea water as a reducing agent into an exhaust pipe, and a reduction catalyst which is provided on the downstream of the injector in the exhaust pipe and purifies NOx in exhaust by reacting with ammonia generated by hydrolysis of urea water.

In some exhaust purification systems, a mixer for promoting mixing of urea water injected into the exhaust pipe and the exhaust gas flowing into the exhaust pipe is disposed on the downstream of the injector in the exhaust pipe and on the upstream of the reduction catalyst.

When urea water injected into the exhaust pipe is hydrolyzed, ammonium carbamate, a strongly corrosive substance, is generated. For example, if the generated strong corrosive substance continues to adhere to the inner wall of the exhaust pipe, the support portion supporting the mixer to the exhaust pipe, or the like, the inner wall of the exhaust pipe, the support portion of the mixer, or the like may corrode and deteriorate.

CITATION LIST

Patent Literature

PTL 1
Japanese Patent Application Laid-Open No. 2009-220033

SUMMARY OF INVENTION

Technical Problem

It is difficult to accurately diagnose the degradation degree due to corrosion of a constituting component in the exhaust purification system, such as the state of corrosion caused in the inner wall of the exhaust pipe and the support portion of the mixer, by visual or the like.

As a result, it is difficult to detect degradation of the constituting component in the exhaust purification system at an early stage.

It is an object of the present disclosure to provide a degradation diagnostic device for an exhaust purification system capable of detecting degradation of a constituting component in the exhaust purification system at an early stage.

Solution to Problem

The degradation diagnosis device for an exhaust purification system according to an embodiment of the present disclosure comprises:
a degradation degree estimation section that estimates a degradation degree due to corrosion of a constituting component in the exhaust purification system based on a temperature of the exhaust gas and an injection amount of a reducing agent injected into the exhaust pipe;
a determination section that determines whether the degradation degree estimated by the degradation degree estimation section exceeds a predetermined threshold; and
an output section that outputs a determination result made by the determination section.

Advantageous Effects of Invention

According to the present disclosure, it is possible to detect degradation of the constituting component in the exhaust purification system at an early stage.

DESCRIPTION OF EMBODIMENT

Hereinafter, preferred embodiments of the present disclosure will be described in detail with reference to the appended drawings. This embodiment will be described a case where the present disclosure is applied to a diesel engine (an internal combustion engine) mounted on an automobile. Hereinafter, the diesel engine is sometimes simply referred to as an engine.

An example of a schematic structure of exhaust purification system 1 for purifying the exhaust gas discharged from engine 10 to exhaust pipe 2 will be described with reference to FIG. 1.

Figure 1:
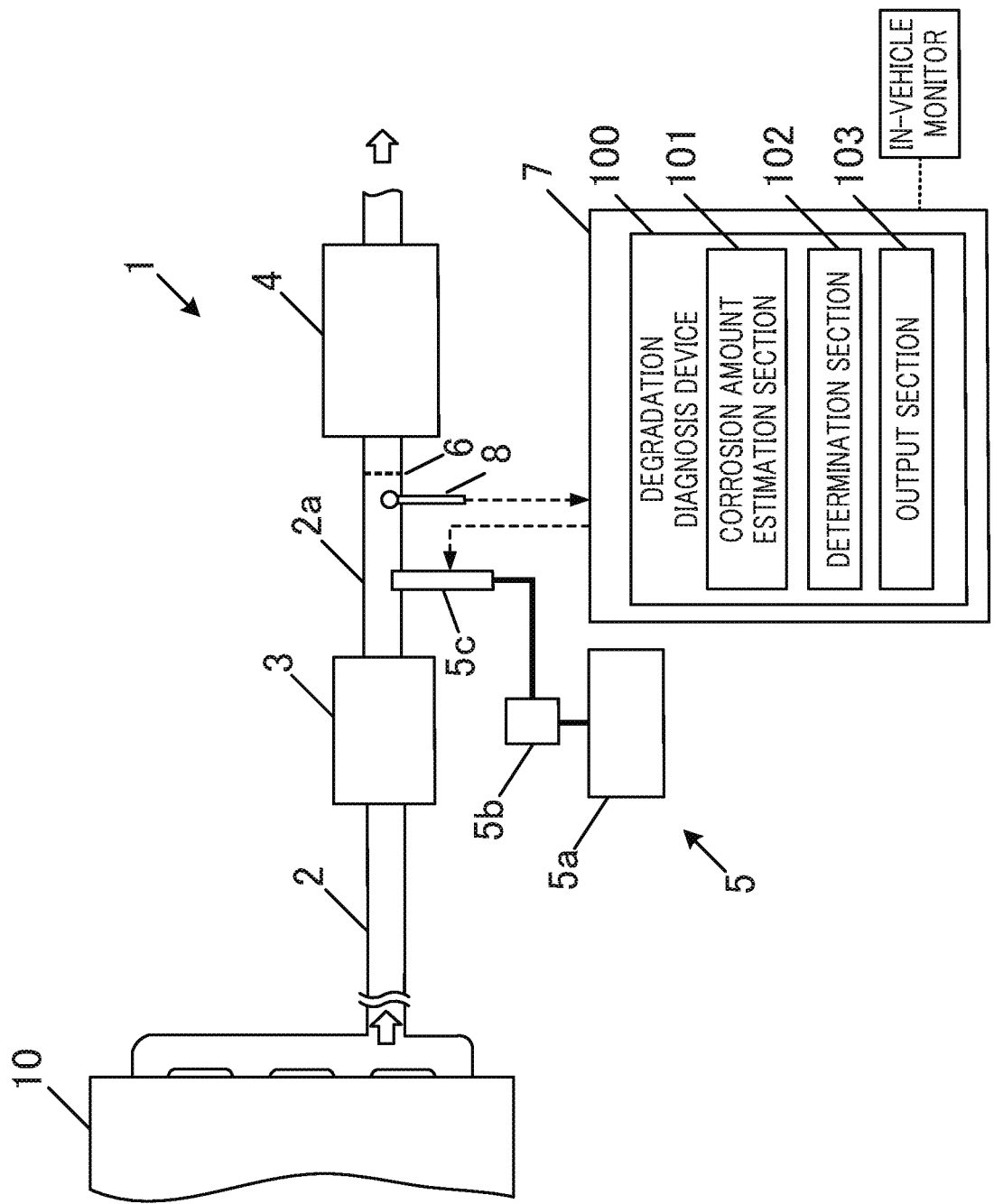
FIG. 1 is a block diagram showing an example of a configuration of the exhaust purification system according to an embodiment of the present disclosure.

As shown in FIG. 1, engine 10 is provided with exhaust pipe 2 for discharging the exhaust gas from engine 10. Exhaust pipe 2 is provided with exhaust purification system 1 for purifying the exhaust gas is provided.

Exhaust purification system 1 includes DPF 3 (diesel particulate filter), urea SCR catalyst (hereinafter referred to as SCR) 4, urea water injection device 5, mixer 6, and control device 7. DPF 3 removes particulate matter (hereinafter referred to as PM) contained in the exhaust gas. SCR 4 is a selective reduction catalyst for reducing nitrogen oxides contained in the exhaust gas.

DPF 3 is, for example, a continuously regenerating DPF. DPF 3 includes a filter body for collecting the PM, and an oxidation catalyst disposed on the upstream side of the flow of the exhaust gas with respect to the filter body. The filter body and the oxidation catalyst are contained in a casing. Exhaust pipe 2 is provided with SCR 4 on the downstream side of the exhaust gas flow with respect to DPF 3 (hereinafter, simply referred to as a downstream side).

SCR 4 uses ammonia as a reducing agent to reduce nitrogen oxides. SCR 4 is obtained by supporting a catalyst component (e.g., a zeolite or the like) on a carrier (e.g., a honeycomb structural carrier or the like).

DPF 3 and SCR 4 are provided arranged in series along the flow of the exhaust gas to the exhaust pipe 2. DPF 3 is located on the upstream of SCR 4 (on engine 10 side). Exhaust pipe 2 for connecting the downstream opening of DPF 3 and the upstream opening of SCR 4, in particular, sometimes referred to as connecting pipe 2a.

Urea water injection device 5 includes urea water tank 5a for storing urea water, urea water pump 5b for pumping urea water from urea water tank 5a, urea water injector 5c for injecting urea water into connecting pipe 2a. The urea water injected from urea water injector 5c into connecting pipe 2a is hydrolyzed by the exhausting heat. As a result, ammonia ($NH_3$) is generated and supplied to the downstream side SCR 4.

Mixer 6 is disposed in connecting pipe 2a on the downstream of urea water injection device 5 and on the upstream of SCR 4. Mixer 6 equalizes the mixing of the exhaust gas and the reducing agent.

Control device 7 totally controls the operation of exhaust purification system 1. Control device 7 includes a CPU for executing various control processes, and a computer having a ROM, a RAM, a hard disk or the like as a storage unit for storing various information and programs necessary for the operation of the CPU. Control device 7 controls the injection quantity and the injection duration of the urea water in urea water injector 5c.

As described above, when the urea water injected into connection pipe 2a is hydrolyzed, a strong corrosive substance is generated, and if the strong corrosive substance continues to adhere to the inner wall of connection pipe 2a, connection pipe 2a may corrode and deteriorate. Further, by adhering the strong corrosive substance to mixer 6, the support portion for supporting mixer 6 to connecting pipe 2a may corrode and deteriorate. As described above, the urea water injected into connecting pipe 2a causes the constituting component of exhaust purification system 1 to deteriorate. However, it is difficult to accurately diagnose the degradation degree due to corrosion of the constituting component in exhaust purification system 1 by visual or the like. Further, since it is necessary to disassemble the exhaust system in a state where the vehicle is stopped in order to perform visual confirmation, it is troublesome to perform visual confirmation in the first place. Therefore, in the present embodiment, degradation diagnosis device 100 in exhaust purification system 1 is provided.

Hereinafter, as an example of the degradation degree due to corrosion of the constituting component in exhaust purification system 1, the corrosion amount of connecting pipe 2a will be described. Degradation diagnosis device 100 includes corrosion amount estimation section 101 (corresponding to the degradation degree estimation section of the present disclosure), determination section 102, and output section 103.

Temperature sensor 8 detects the temperature of the exhaust gas (the temperature in connecting pipe 2a).

Corrosion amount estimation section 101 estimates the total corrosion amount of exhaust pipe 2 based on the temperature of the exhaust gas detected by temperature sensor 8 and the injection amount per unit time of urea water injected into connecting pipe 2a (hereinafter, simply referred to as "injection amount"). It should be noted that in the following description, the corrosion amount per unit time is simply referred to as "corrosion amount".

Determination section 102 determines whether the estimated total corrosion amount exceeds a predetermined threshold value, and outputs the determination result.

Figure 2:
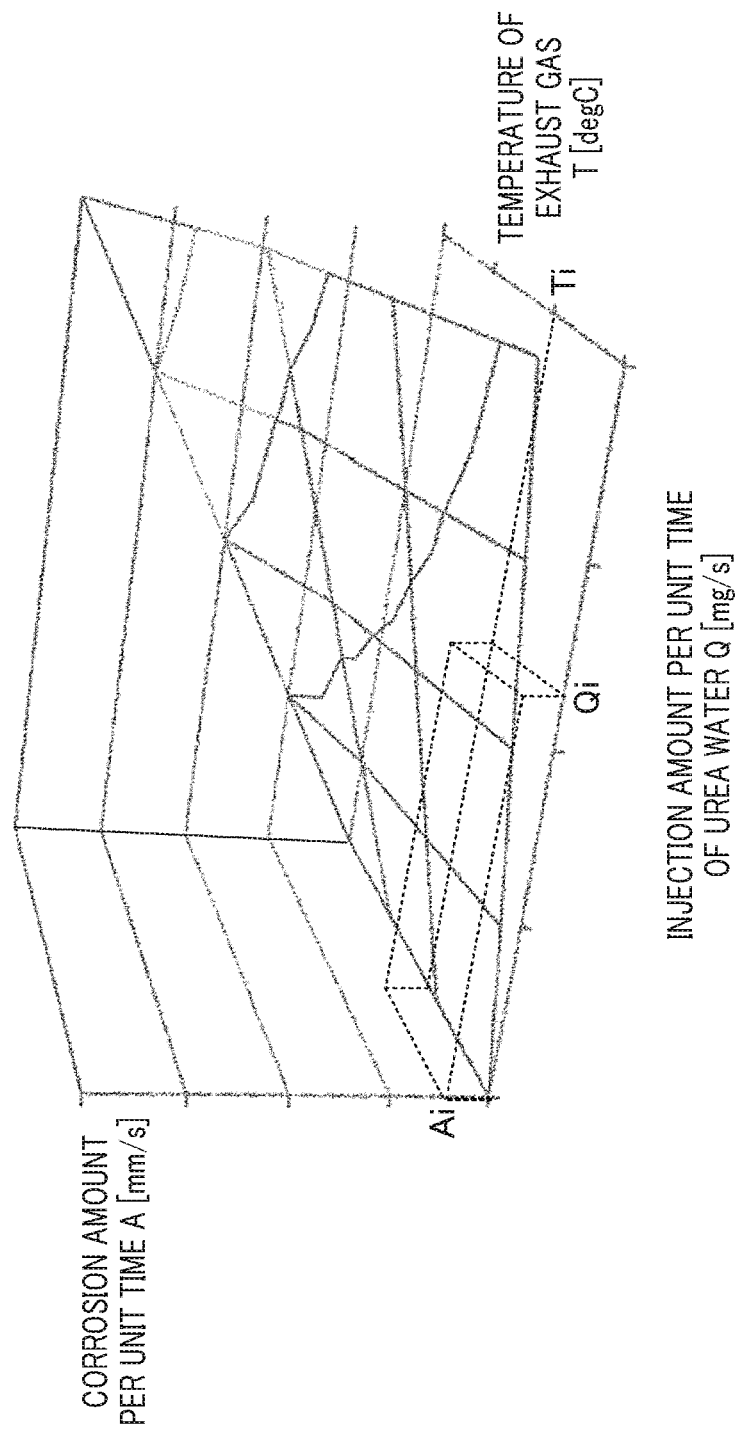
FIG. 2 is a three-dimensional map showing an example of the mutual relationship among the temperature of the exhaust gas, the injection amount of urea water, and the corrosion amount of the connection pipe.

FIG. 2 is a three-dimensional map showing an example of the mutual relationship among temperature T [deg C.] of the exhaust gas, injection amounts Q [mg/s] of urea water, and corrosion amounts A [mm/s]. FIG. 2 shows temperature $T_i$ of the exhaust gas, injection amount $Q_i$ of urea water, and corrosion amount $A_i$. Such a three-dimensional map is determined in advance by, for example, experiments. The map is stored in a storage unit (not shown) of control device 7.

In the present embodiment, corrosion amount estimation section 101 estimates corrosion amount $A_i$, with reference to the three-dimensional map shown in FIG. 2, based on temperature $T_i$ of the exhaust gas and injection amount $Q_i$ of urea water. In a case where a relational expression of temperature $T_i$ of the exhaust gas and injection amount $Q_i$ of urea water is provided in advance, corrosion amount $A_i$ may be obtained by substituting temperature $T_i$ of the exhaust gas and injection amount $Q_i$ of urea water into the relational expression.

Hereinafter, a method of calculating total corrosion amount $\Sigma A$ using the above-mentioned corrosion amount A will be described.

Figure 3:
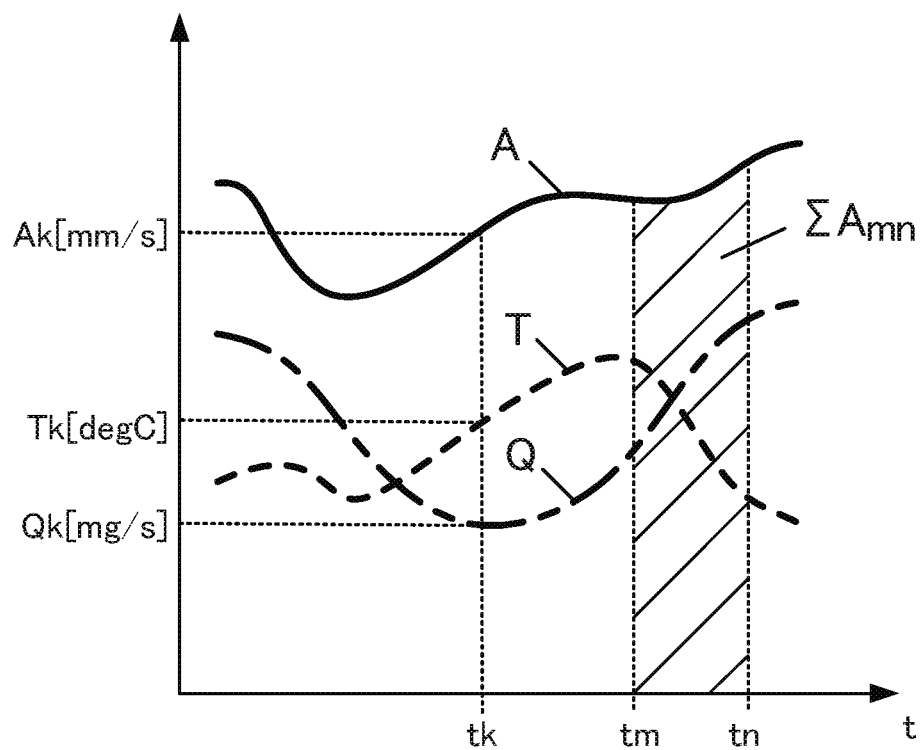
FIG. 3 is a diagram showing an example of each numerical value of the temperature of the exhaust gas that varies with time, the injection amount of urea water and the corrosion amount of the connection pipe.

FIG. 3 is a diagram showing temperature T [deg C.] of the exhaust gas, injection amounts Q [mg/s] of urea water, and corrosion amounts A [mm/s] that change in time series. The horizontal axis shown in FIG. 3 represents time t, and the vertical axis represents the respective numerical values of temperature T of the exhaust gas, injection amount Q of urea water, and corrosion amount A. For example, respective numerical values at injection time tk is temperature $T_k$ of the exhaust gas, injection amount $Q_k$ of urea water, and corrosion amount $A_k$.

Corrosion amount estimation section 101 calculates total corrosion amount $\Sigma A$ [mm] by integrating corrosion amount A [mm/s] with time. For example, corrosion amount estimation section 101 calculates total corrosion amount $\Sigma A_{mn}$ corresponding to the progress from time tm to tn by integrating corrosion amount A from time tm to tn.

As described above, determination section 102 determines whether total corrosion amount $\Sigma A$ exceeds a predetermined threshold value. Output section 103 outputs the determination result of determination section 102. There are various means for informing the driver or the like of the determination result. For example, the determination result may be displayed as a message on the in-vehicle monitor, or may be provided as an alarm sound by a buzzer. In addition, a communication unit (not shown) mounted on the vehicle may notify the monitoring center (remote place) via a communication network.

Degradation diagnosis device 100 in exhaust purification system 1 according to the above-described embodiment, based on the temperature of the exhaust gas discharged from engine 10 and the injection amount of urea water injected into connection pipe 2a, estimates the total corrosion amount of connection pipe 2a, determines whether the estimated total corrosion amount exceeds a predetermined threshold value, and outputs the determination result. Thus, it is possible to increase the accuracy of diagnosing the total corrosion amount of connecting pipe 2a. Consequently, the corrosion of connecting pipe 2a can be detected at an early stage. Further, even if the vehicle is running, even if exhaust pipe 2 is in a state of high temperature, also, even without performing disassembly work of the exhaust system, it is possible to diagnose the degradation degree due to corrosion.

Further, by notifying the determination result of whether the total corrosion amount exceeds a predetermined threshold to the driver or the like, it is possible to prompt the early replacement and the maintenance of connecting pipe 2a. In addition, if the quality of the exhaust pipe and the supporting portion of the mixer (hereinafter referred to as the exhaust pipe and the like) are set on the assumption of the exhaust pipe or the like in a case where the exhaust pipe and the like are used under the expected worst condition, the quality of the exhaust pipe and the like becomes excessive. If the use of the exhaust pipe and the like is not assumed, there is a fear that the function of the exhaust pipe and the like may fail. However, according to the degradation diagnosis device 100 of the present embodiment, since corrosion of the exhaust pipe and the like can be detected at an early stage, it is possible to set the quality of the component on the assumption of replacement thereof. In a case where the replacement of the component is assumed, an inexpensive material with good moldability can be used when manufacturing the component, so that excessive quality can be suppressed. Further, for example, by performing replacement and maintenance of the component, it is possible to ensure durability.

In the above embodiment, the estimation of the total corrosion amount of connecting pipe 2a by corrosion amount estimation section 101 is performed based on the injection amount of the urea water (reducing agent), but the present disclosure is not limited to this, and the estimation may be performed based on, for example, the injection time of the urea water.

Further, in the above embodiment, the degradation degree due to corrosion of the component in exhaust purification system 1 is the corrosion amount of connecting pipe 2a, but the present disclosure is not limited to connecting pipe 2a, and any component, for example, the mixer 6 or the like, that deteriorates due to urea water injected into exhaust pipe 2 can be applicable. In that case, a map of the degradation degree due to corrosion of the component, which is referred to by the temperature of the exhaust gas and the injection amount of urea water, is created. Corrosion amount estimation section 101 estimates the corrosion amount of the component with reference to the map.

Further, in the above embodiment, the temperature of the exhaust gas is detected by temperature sensor 8, but the present disclosure is not limited thereto. The temperature of the exhaust gas may be estimated based on the temperature of the wall surface of connecting pipe 2a.

Further, in the above embodiment, the corrosion amount of connecting pipe 2a is estimated based on the temperature of the exhaust gas and the injection amount of the reducing agent, but the estimated corrosion amount may be corrected based on the flow rate of the exhaust gas flowing through connecting pipe 2a. The estimated corrosion amount may be corrected based on the temperature of the reducing agent.

This application is based on Japanese Patent Application No. 2018-056008, filed on Mar. 23, 2018, the contents of which are incorporated herein by reference.

INDUSTRIAL APPLICABILITY

The degradation diagnosis device in the exhaust purification system 1 of the present disclosure is useful for a vehicle equipped with an internal combustion engine which is required to detect degradation of the component of exhaust purification system 1 at an early stage.

REFERENCE SIGNS LIST

1 Exhaust purification system
2 Exhaust pipe
2a connecting pipe
3 DPF
4 Urea SCR catalyst (SCR)
5 Urea water injection device
5a urea water tank
5b urea water pump
5c urea water injector
6 Mixer
7 Control device
8 Temperature sensor
10 Engine
100 Degradation diagnosis device
101 Corrosion amount estimation section
102 Determination section
103 Output section

What is claimed is:

1. A degradation diagnosis device for an exhaust purification system to purify exhaust gas discharged from an internal combustion engine into an exhaust pipe, the degradation diagnosis device comprising:
    a degradation degree estimation section that estimates a degradation degree due to corrosion of a constituting component in the exhaust purification system based on a temperature of the exhaust gas and an injection amount of a reducing agent injected into the exhaust pipe;
    a determination section that determines whether the degradation degree estimated by the degradation degree estimation section exceeds a predetermined threshold; and
    an output section that outputs a determination result made by the determination section.

2. The degradation diagnosis device for the exhaust purification system according to claim 1, wherein
    the degradation degree estimation section estimates the degradation degree per unit time based on the temperature of the exhaust gas and the injection amount per unit time of the reducing agent.

3. The degradation diagnosis device for the exhaust purification system according to claim 2, wherein
    the degradation degree estimation section estimates the degradation degree per unit time by referring to a map indicating the degradation degree per unit time referred to by the temperature of the exhaust gas and the injection amount per unit time of the reducing agent.

4. The degradation diagnosis device for the exhaust purification system according to claim 1, wherein
    the degradation degree estimation section estimates the temperature of the exhaust gas based on a wall surface temperature of the exhaust pipe.

5. The degradation diagnosis device for the exhaust purification system according to claim 2, wherein
    the degradation degree estimation section corrects the degradation degree based on a flow rate of the exhaust gas flowing in the exhaust pipe.

6. The degradation diagnosis device for the exhaust purification system according to claim 2, wherein
    the degradation degree estimation section corrects the degradation degree based on a temperature of the reducing agent.

7. The degradation diagnosis device for the exhaust purification system according to claim 1, wherein
    the output section outputs the determination result to a notification section that makes a notification to a driver of a vehicle equipped with the exhaust purification system.

8. The degradation diagnosis device for the exhaust purification system according to claim 1, wherein
    the output section outputs the determination result to a communication section that reports, via a communication network, to a monitoring center installed at a remote location.

9. The degradation diagnosis device for the exhaust purification system according to claim 1, wherein
the degradation degree due to corrosion of a constituting component is a corrosion amount of the exhaust pipe.

10. The degradation diagnosis device for the exhaust purification system according to claim 1, wherein
the degradation degree due to corrosion of a constituting component is a corrosion amount of a support portion supporting a mixer to the exhaust pipe, the mixer being for promoting mixing of urea water injected into the exhaust pipe and the exhaust gas flowing into the exhaust pipe.

* * * * *